(12) United States Patent
Autenrieth et al.

(10) Patent No.: US 6,280,701 B1
(45) Date of Patent: Aug. 28, 2001

(54) METHOD FOR THE TREATMENT OF A METHANOL REFORMING CATALYST

(75) Inventors: Rainer Autenrieth, Erbach; Otto Krumberger, Mannheim, both of (DE)

(73) Assignees: Xcellsis GmbH, Kirchheim/Teck-Nabern; BASF Aktiengesellschaft, Ludwigshafen, both of (DE)

( * ) Notice: Subject to any disclaimer, the term of this patent is extended or adjusted under 35 U.S.C. 154(b) by 0 days.

(21) Appl. No.: 09/568,576

(22) Filed: May 11, 2000

Related U.S. Application Data

(62) Division of application No. 09/097,015, filed on Jun. 15, 1998, now Pat. No. 6,083,863.

(30) Foreign Application Priority Data

Jun. 13, 1997 (DE) .............................................. 197 25 009

(51) Int. Cl.⁷ ...................................................... C01B 3/40
(52) U.S. Cl. .......................... 423/652; 252/372; 252/373; 502/20
(58) Field of Search ................................. 423/648.1, 652; 252/372, 373; 502/20; 422/180

(56) References Cited

U.S. PATENT DOCUMENTS

| 4,913,842 | * | 4/1990 | Yoneoka ............................... 252/373 |
| 5,075,268 | * | 12/1991 | Kurashige et al. ..................... 502/52 |

FOREIGN PATENT DOCUMENTS

| 1 246 688 | 8/1967 | (DE) . |
| 158464 | 1/1983 | (DE) . |
| 33 14 131 A1 | 10/1984 | (DE) . |
| 35 31 757 A1 | 3/1986 | (DE) . |
| 281 757 | 8/1990 | (DE) . |
| 0 201 070 A2 | 11/1986 | (EP) . |
| 2 132 108 | 7/1984 | (GB) . |
| 52 063194 | 5/1977 | (JP) . |
| 632099753 | * | 8/1988 | (JP) . |
| 3-45501 | 2/1991 | (JP) . |
| 3-196839 | 8/1991 | (JP) . |
| 3-249943 | 11/1991 | (JP) . |
| 5-261288 | 10/1993 | (JP) . |
| 9-286603 | 11/1997 | (JP) . |
| 8 202 151 | 1/1983 | (SA) . |

OTHER PUBLICATIONS

Patent Abstracts of Japan, JP 06–015172, Jan. 25, 1994, Sakurada Satoshi.
Patent Abstracts of Japan, JP 58–017836, Feb. 2, 1983, Hirose Yoshikazu.
Patent Abstracts of Japan, Publication No. 04141234 A, Moriga Takuya et al., Oct. 2, 1990.
Patent Abstracts of Japan, Publication No. 63310703 A, Seya Akitoshi, Jun. 13, 1987.
Patent Abstracts of Japan, Publication No. 63315501 A, Yoshioka Hiroshi et al., Jun. 16, 1987.

* cited by examiner

*Primary Examiner*—Steven P. Griffin
*Assistant Examiner*—Maribel Medina
(74) *Attorney, Agent, or Firm*—Crowell & Moring, L.L.P.

(57) ABSTRACT

A method for the treatment of a methanol reforming catalyst includes pre-aging the catalyst by baking it out in a dry atmosphere in order thereby to complete its inherent initial loss of volume before the start of the methanol reforming reaction. The method may be used for methanol reforming reactors in fuel-cell-operated motor vehicles.

2 Claims, 1 Drawing Sheet

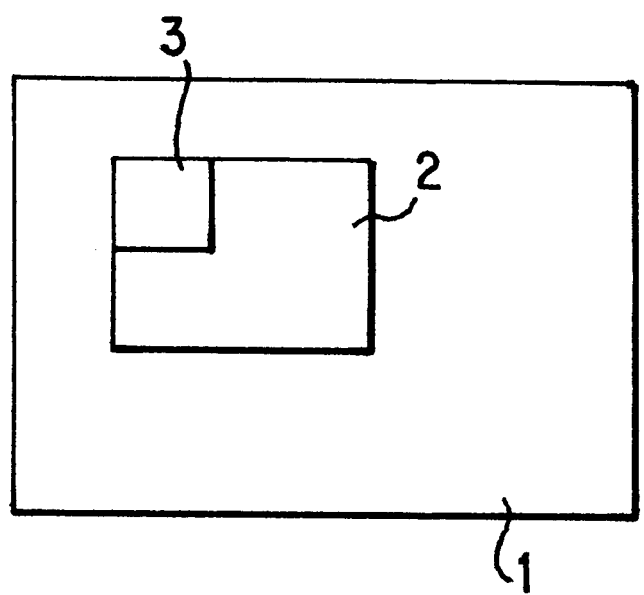
Figure

METHOD FOR THE TREATMENT OF A METHANOL REFORMING CATALYST

This application is a division of application Ser. No. 09/097,015 filed Jun. 15, 1998 now U.S. Pat. No. 6,083,863.

BACKGROUND AND SUMMARY OF THE INVENTION

This application claims the priority of German Patent Document No. 197 25 009.2, filed Jun. 13, 1997, the disclosure of which is expressly incorporated by reference herein.

The present invention relates to a method for the treatment of a methanol reforming catalyst. Such catalysts are known in various compositions. See, for example, patent applications DE 35 31 757 A1 and EP 0 201 070 A1. Usually the catalyst material is placed in the form of a charge of catalyst pellets into the reforming reaction chamber of a methanol reforming reactor. Such reactors serve, for example, for the production of hydrogen for the fuel cells of a fuel-cell-operated motor vehicle by the hydrogen reforming of liquid methanol carried by it.

Various methods have been proposed for sustaining a high catalytic activity and for the achievement of a long life of the methanol reforming catalyst. Thus, in patent application JP 4-141234 (A) a special formulation of different metal oxides is given for obtaining a catalyst with a long life and high activity and selectivity.

In patent application JP 63-310703 (A) the catalyst material is subjected in the reforming reaction chamber of a methanol reforming reactor to a reduction reaction prior to the start of the operation of the reforming reaction, leading to a reduction of the volume of the catalyst. A compression spring-loaded, movable cover plate keeps the catalyst material that has been placed in the reaction chamber in the form of a charge of pellets compressed in a tight pack. The reduction reaction is a process necessary for the operation of a copper catalyst. The shrinkage that occurs is definitely less than the shrinkage that occurs during the normal reforming operation.

In patent application JP 63-315501 (A) it is proposed to place an air chamber between a burner and a reforming reaction chamber, through which air can be fed in a controlled manner in order to keep the catalyst temperature at a given level.

In a process disclosed in patent application DE 33 14 131 A1, to prolong the life of the methanol reforming catalyst, the methanol is freed of any chlorine compounds contained therein, before it is brought into contact with the catalyst.

In patent application GB 2 132 108 A it is known, in starting up a methanol reforming reactor to heat the catalyst material present in the reaction chamber rapidly by burning methanol with a stoichiometric or less than stoichiometric oxygen content and passing the combustion exhaust gases both through a tempering chamber in thermal contact with the reaction chamber and also through the reaction chamber itself. Water can be sprayed into the combustion gas stream that is fed into the reaction chamber in order to prevent overheating. As soon as the desired reforming temperature is reached the heating process is terminated and the reforming process is started. This is the case typically within less than a minute.

In patent application DE 1 246 688 a methanol reforming reactor is disclosed that contains a nickel catalyst and a zinc-copper catalyst. In use, the reforming reaction is periodically interrupted for catalyst treatment phases which comprise a regenerating phase and optionally a subsequent nickel catalyst reactivation phase. In the regenerating phases the reactor is flushed out with a gas containing free oxygen at a temperature between 150° C. and 450° C., while in the nickel catalyst reactivation phases a purging is performed with a gas containing free hydrogen. The manufacturing process for the nickel catalyst prior to its use in the methanol reformation includes at the end a treatment of a nickel foreproduct in a reducing atmosphere for reduction to metallic nickel for several hours at temperatures between 150° C. and 600° C. For the zinc-copper catalyst, at the end of the process by which it was made, provision can be made for heat treatment at 250° C. for four hours to remove any granulating aid that may have been used.

A known fact of virtually all current methanol reforming catalysts is that in the first hours of the operation of methanol reforming they undergo a marked loss of volume that results in a corresponding lessening of the performance of a methanol reforming reactor containing the catalyst.

The present invention is addressed to the technical problem of devising a method for treating a methanol reforming catalyst such that, in the first hours of operation, a methanol reforming reactor containing the catalyst will exhibit no marked loss of performance caused by any lessening of specific catalytic activity due to the catalyst's loss of volume.

BRIEF DESCRIPTION OF DRAWING

The FIGURE shows a block diagram of a methanol reforming reactor with a methanol reforming catalyst.

DETAILED DESCRIPTION OF PREFERRED EMBODIMENTS

The present invention solves this problem by the following method for the treatment of a methanol reforming catalyst. The treatment involves several hours of baking out the methanol reforming catalyst in a dry atmosphere, which is oxidizing or inert, at a sufficiently high temperature for the purpose of pre-aging it. The result of the pre-aging treatment is that during this process, and hence prior to its use in the methanol reforming operation, the catalyst undergoes its typical initial loss of volume. The parameters of the process are accordingly so chosen that this desired pre-aging effect is achieved, so that at the end of the pre-aging treatment the methanol reforming catalyst is in a substantially completely shrunken form in which, when used afterward in the methanol reforming operation, it shows no marked additional shrinkage. To achieve this, the time and temperature of the pre-aging treatment are appropriately adapted to the catalyst material in question which can be made with any of the conventional compositions.

As an example representative of many additional embodiments of the present invention, a conventional Cu/ZnO/Al$_2$O$_3$ methanol reforming catalyst will be considered, in which the Cu/ZnO material forms the catalytically active component, which is suitable for catalyzing the water vapor reforming of methanol in a corresponding methanol reforming reactor. The FIGURE shows a block diagram of a methanol reforming reactor 1 having a reaction space 2 with catalyst material 3. The catalyst material is made usually in the form of pellets and loaded in bulk into the reforming reaction chamber of the methanol reforming reactor.

To prevent the performance of the reactor, i.e., the conversion, from decreasing markedly in the first hours of the reforming reaction, the methanol reforming catalyst is previously subjected to a pre-aging treatment.

This pre-aging of the catalyst can take place outside of the reforming reaction chamber before the catalyst is put into it, or alternatively within the reforming reaction chamber, catalyst material being added in the latter case several times during the aging process to compensate for the shrinkage that occurs. The process for the pre-aging treatment of the catalyst material involves baking out the conventionally made catalyst material in lo a dry atmosphere at the appropriate temperature. "Dry," in this connection, means a moisture content of less than one volume-percent. If the manufactured catalyst material is in unreduced form, the pre-aging baking-out process can be performed in air. If the catalyst material is in reduced form due to previous use in a reducing reaction, the baking out is performed in an inert atmosphere, e.g., a nitrogen or argon atmosphere.

The type and temperature of the baking-out process are adapted to the catalyst material involved. Typically, the temperature is in the range of the temperatures commonly used for the later methanol reforming reaction, e.g., of the order of 300° C. or higher. Typical baking-out time is in the range of several hours. Due to the pre-aging treatment, the catalyst material undergoes the typical initial shrinkage. At the same time, it appears that the process conditions chosen for this treatment assure that the pre-aged catalyst present at the end of the treatment has largely shrunk, i.e., during its subsequent use in catalyzing the methanol reforming reaction it no longer markedly decreases in volume. Preferably, the treatment parameters are selected such that the catalyst material shrinks to the smallest achievable volume.

After the pre-aging process ends, the pre-aged methanol reforming catalyst can be loaded into the reforming reaction chamber of a methanol reforming reactor if it was not already pre-aged therein. If the pre-aged catalyst material is not immediately needed, it can be preserved in a closed container, and this enables the aging effect to be sustained over a fairly long period of storage.

The methanol reforming catalyst treated by this process, which has undergone its inherent shrinkage during the pre-aging, no longer shows any substantial shrinkage even in the first hours of a subsequent reforming reaction. Accordingly, its specific activity, and the conversion achieved by a methanol reforming reactor in whose reforming reaction chamber the catalyst is contained, are largely preserved from the very beginning of the reforming reaction process.

An additional advantage of the pre-aged methanol reforming catalyst that is present in the reforming reaction chamber is that, for the reforming reaction process that follows, no appreciable amounts of discardable catalyst components are created which otherwise could result in harm to reactor components that follow.

The method of the invention is especially suitable for the preparation of a methanol reforming catalyst for use in a methanol reforming reactor of a fuel-cell-operated motor vehicle in order to catalyze therein the water vapor reforming of liquid methanol for the production of hydrogen for the fuel cells.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for water vapor reforming of methanol, comprising:

placing a volume-reduced pre-aged catalyst into a reactor; and catalyzing a reaction between methanol and water, wherein said pre-aged catalyst does not undergo a loss in volume during said catalyzing, wherein said volume-reduced pre-aged catalyst was pre-aged prior to use in the catalyzing by heating the catalyst in a dry, oxidizing atmosphere at a temperature of at least 300° C.

2. A method for water vapor reforming of methanol, comprising:

placing a volume-reduced pre-aged catalyst into a reactor; and catalyzing a reaction between methanol and water, wherein said pre-aged catalyst does not undergo a loss in volume during said catalyzing, wherein said volume-reduced pre-aged catalyst was pre-aged prior to use in the catalyzing by heating the catalyst in a dry, inert atmosphere at a temperature of at least 300° C.

* * * * *